United States Patent [19]

Woods

[11] Patent Number: 4,496,218
[45] Date of Patent: Jan. 29, 1985

[54] HYDRAULIC AUTOMATIC LIGHT CONTROL

[75] Inventor: Charles E. Woods, Ridgecrest, Calif.

[73] Assignee: The United States of America as represented by the Secretary of the Navy, Washington, D.C.

[21] Appl. No.: 391,817

[22] Filed: Jun. 24, 1982

[51] Int. Cl.³ .......................................... G05D 25/00
[52] U.S. Cl. ................... 350/267; 350/449; 350/312
[58] Field of Search ............... 350/267, 312, 318, 449; 354/270

[56] References Cited

U.S. PATENT DOCUMENTS

| 612,937 | 10/1898 | Uebelacker . | |
|---|---|---|---|
| 1,234,333 | 7/1917 | Heathcote . | |
| 2,481,660 | 9/1949 | Harrison | 350/267 |
| 2,537,011 | 1/1951 | Aparicio | 350/312 |
| 3,560,077 | 2/1971 | Sooy et al. | 350/160 |
| 3,572,907 | 3/1971 | Cindrich | 350/312 |
| 3,695,681 | 10/1972 | Dockery | 350/267 |
| 3,990,786 | 11/1976 | Jorna et al. | 350/205 |
| 4,065,207 | 12/1977 | Zavitsanos et al. | 350/312 |

FOREIGN PATENT DOCUMENTS 584450 10/1959 Canada .............................. 350/312

Primary Examiner—John K. Corbin
Assistant Examiner—William Propp
Attorney, Agent, or Firm—R. F. Beers; W. Thom Skeer; Kenneth G. Pritchard

[57] ABSTRACT

An improved, controlled automatic light control device is provided by the use of a hydraulic automatic light control. Hydraulic control avoids inherent problems of mechanical automatic light control devices. A liquid used for light absorption permits the entire iris area to darken without loss of aperture. The uniform extinction without diffraction limitations of mechanically driven automatic light control devices is significantly improved. The use of thermoelectric coolers and heat sinks provides reliability in a large dynamic range environment without warping or other distortion of the system. The device is applicable for visible light to near infrared light.

12 Claims, 1 Drawing Figure

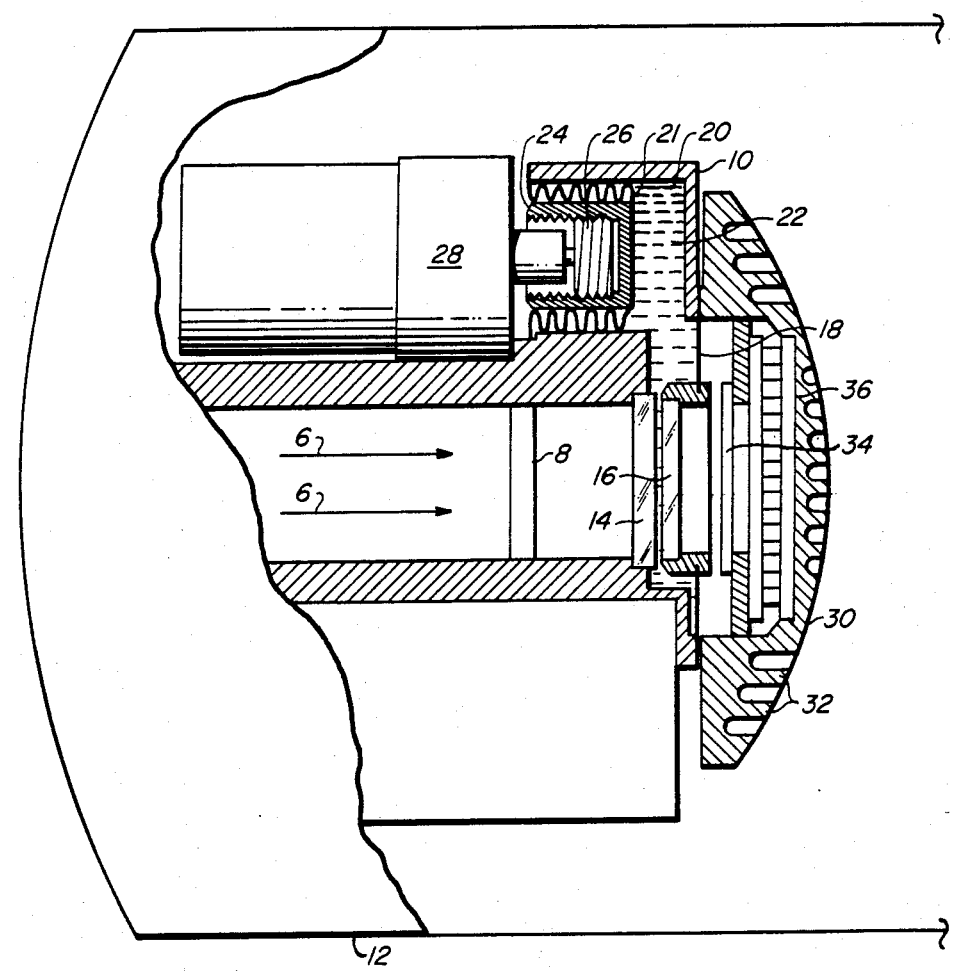

HYDRAULIC AUTOMATIC LIGHT CONTROL

BACKGROUND OF THE INVENTION

1. Field of the Invention

The present invention is for large aperture light control devices. In particular, this invention is suitable for charge coupled device (hereafter CCD) cameras. Specifically, the present invention provides high sensitivity control for the imager section of a CCD seeker in a weapons system.

2. Description of the Prior Art

Previously, vidicon camera systems were inappropriate for small lightweight applications such as missile system seekers. In general, they are too big and clumsy for use in such systems. They are further limited by their slow response time. The single advantage of vidicon cameras over CCD camera systems is the wide-range sensitivity control of a vidicon camera. The use of charge coupled devices for camera systems has been subject to over-saturation or image blooming. Image blooming refers to the situation when pixels of a charge coupled device in a given area are saturated. Incoming photons in effect spill over into neighboring pixels causing the saturated image to bloom and grow, encompassing a larger and larger area.

To expand the dynamic range of CCD camera systems without use of mechanical irises, the automatic light control, ALC, device was created. The automatic light control device permits the aperture area to remain constant and provides uniform extinction over the aperture area as light intensity increases. Aperture control with irises is not suitable for CCD devices. As the aperture becomes smaller, diffraction effects become increasingly important and eventually limit operation of a device with an automatic iris. Thus, the automatic iris imposes an inherent limit on how far down light control can be reduced before other factors prevent operability. The inherent sensitivity of CCD devices requires a great deal of aperture reduction to control a significant dynamic range. Thus, while a CCD device has relatively small size and weight due to its being a voltage-controlled device, it has significant dynamic range limitations and needs external assistance to be used.

The invention "Absorption Path Controlled Filter" by Theodore B. Bailey permitted CCD devices to be used. The basic feature of the Absorption Path Controlled Filter is its use of an optical absorbing fluid to fill the role of the iris. Basically, the increased depth of an optical working fluid increases the absorption through the aperture area. A fixed optic element and a movable optical element are used with a working fluid reservoir. This reservoir automatically fills the space between the optical elements as the movable element moves away from the fixed element. Previous automatic light control devices have been mechanically driven. This required sliding O-ring seals, automatic volume change adjustment, bearings, high wear parts, no inherent fluid damping, and is especially sensitive to vibration. These systems have backlash or play in the system. All these drawbacks need to be overcome for an automatic light control device to provide inherent reliability and dependability needed in hostile environments. In particular, the nose cone of a missile undergoing massive g-force acceleration is considered a hostile environment for a mechanical or hydraulic device.

SUMMARY OF THE INVENTION

Large aperture control is provided by the use of a reversible electric motor mounted to a worm screw to drive a fluid piston. The piston provides uniform pressure over finely controlled incremental distances. Increased pressure by the piston results in increased pressure in the working fluid. The movable optical element of an automatic light control device is held in place by a diaphragm. As the pressure in the working fluid increases, the diaphragm deflects providing a controlled gap between fixed and movable optical elements which is always filled with absorption fluid. The use of a diaphragm made of stainless steel or a similar material permits a spring configuration to be maintained while the amount of elasticity stays well within elastic limits. This permits well-calculated levels of deflection in the diaphragm which return upon withdrawal of the piston.

A thermal energy cooler and heat sink are mounted on the back of the automatic light control device to avoid thermal aberrations in the system due to absorbed optical energy. A spectral band filter can be mounted in front of the fixed optical element to limit response to a desired optical range.

BRIEF DESCRIPTION OF THE DRAWING

The FIGURE is a cross-section of the present invention.

DESCRIPTION OF THE PREFERRED EMBODIMENT

The FIGURE is a cross-sectional diagram of the present invention. A housing 10 is mounted within a nose cone 12 of a missile or other optical environment border. Within housing 10 are mounted a fixed optical element 14 and a movable optical element 16. Incident light 6 enters as shown. A spectral bandpass filter 8 can be inserted in front of fixed optical element 14 if desired. Movable optical element 16 is movable because of diaphragm 18. Diaphragm 18 can also be thought of as a spring. Diaphragm 18 can be made of stainless steel approximately 0.004 inches thick. Other materials or thicknesses can be used as appropriate. The requirement for diaphragm 18 is that the elasticity of its material not be exceeded by pressures to be exerted on it and that the pressures exerted on it be adequate to provide deformation of diaphragm 18 such that the space between fixed optical element 14 and movable optical element 16 is uniformly controlled.

A cavity 20 is defined by housing 10, fixed optical element 14, movable optical element 16, diaphragm 18, and bellows 21. Bellows 21 is a metal bellows that is compressed by a piston 24. Within cavity 20 is a light control fluid 22 which can be any suitable working fluid. An example of such a working fluid is ethylene glycol solutions using dyes, such as laser dyes as passive absorbers. The choice of dye may add a spectral component to light control fluid 22, such a choice permits spectral filtering by color. Enclosing cavity 20 is bellows 21 which is next to piston 24 mounted on a worm screw 26. Worm screw 26 is in turn driven by a reversible electric motor 28. Electric motor 28 permits fine control of worm screw 26 so that very minute changes in movement of piston 24 are controlled. These controlled movements relate directly to control of pressure within light control fluid 22. Diaphragm 18 will stay within the elastic limits if properly chosen for the pressures to be exerted due to piston 24. As diaphragm 18 deflects under greater pressure, space between fixed optical element 14 and movable optical element 16 increases. This space is continuously filled with light control fluid 22. As the thickness of light control fluid 22 increases, the amount of absorption of light trying to pass through the device increases. Ideally, fixed optical element 14 and movable optical element 16 are never actually brought into touching contact. Two flat surfaces would develop adhesion forces for one another unless a very finite distance with fluid between them is always maintained.

Surrounding the back of housing 10 is a heat sink 30 which is capable of absorbing excess heat within the system. In addition, heat sink 30 is shown in cross-section with cooling vanes 32 which permit it to dump excess heat. Mounted within heat sink 30 and behind movable optical element 16 is an optical sensor 34 which provides various optical evaluations of incoming light. A CCD imager is a good choice for optical sensor 34. Also mounted within heat sink 30 is a thermoelectric cooler 36 which permits additional cooling to occur. Cooler 36 uses the thermoelectric effect to remove heat from optical sensor 34.

It is obvious to those skilled in the art that other modifications of the above invention can be made.

What is claimed is:

1. A hydraulic automatic light control consisting of:
   a housing;
   a fixed optical element mounted in said housing for permitting light to pass through said housing;
   a movable optical element attached to said housing by a diaphragm and placed in proximity to but not against said fixed optical housing such that light must pass through both optical elements and the space between them to pass through said housing;
   a working fluid in the space between said optical elements for creating an absorption path;
   a piston sealing said working fluid in said space between optical elements for exerting a pressure on said fluid; and
   a drive motor connected to said piston for moving said piston such that the change of pressure on said fluid varies the amount of flexing by said diaphragm which in turn changes the thickness of working fluid between the optical elements.

2. A hydraulic automatic light control as described in claim 1 where said piston further consists of a worm screw threaded into the piston for moving the piston back and forth and a reversible electric drive motor connected to said worm screw for shifting piston screw back and forth.

3. A hydraulic automatic light control as described in claim 2 further consisting of a heat sink mounted to said housing for preventing heat build-up around said fixed and movable optical elements.

4. A hydraulic automatic light control as described in claim 3 further consisting of a thermoelectric cooler within said heat sink for dissipating heat.

5. A hydraulic automatic light control as described in claim 4 further consisting of a bellows between said piston and working fluid for sealing said working fluid.

6. A hydraulic automatic light control as described in claim 5 further consisting of a charge coupled device imager behind said movable optical element for collecting light transmitted through said movable optical element.

7. A hydraulic automatic light control as described in claim 6 further consisting of a spectral filter placed in said housing to filter incoming light prior to said incoming light passing through said fixed and movable optical elements.

8. A hydraulic automatic light control as described in claim 1 further consisting of a heat sink mounted to said housing for preventing heat build-up around said fixed and movable optical elements.

9. A hydraulic automatic light control as described in claim 8 further consisting of a thermoelectric cooler within said heat sink for dissipating heat.

10. A hydraulic automatic light control as described in claim 1 further consisting of a bellows between said piston and working fluid for sealing said working fluid.

11. A hydraulic automatic light control as described in claim 1 further consisting of a charge coupled device imager behind said movable optical element for collecting light transmitted through said movable optical element.

12. A hydraulic automatic light control as described in claim 1 further consisting of a spectral filter placed in said housing to filter incoming light prior to said incoming light passing through said fixed and movable optical elements.

* * * * *